US008570871B2

(12) United States Patent
Yong et al.

(10) Patent No.: US 8,570,871 B2
(45) Date of Patent: Oct. 29, 2013

(54) SIGNALING EXTENSION FOR A LABEL SWITCHED PATH OVER A COMPOSITE LINK

(75) Inventors: Lucy Yong, McKinney, TX (US); Zhenbin Li, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/416,650

(22) Filed: Mar. 9, 2012

(65) Prior Publication Data

US 2012/0230184 A1 Sep. 13, 2012

Related U.S. Application Data

(60) Provisional application No. 61/450,868, filed on Mar. 9, 2011.

(51) Int. Cl.
*H04L 12/26* (2006.01)

(52) U.S. Cl.
USPC .......................................... 370/235

(58) Field of Classification Search
None
See application file for complete search history.

(56) References Cited

U.S. PATENT DOCUMENTS

| 7,656,856 | B2 * | 2/2010 | Ou et al. ...................... 370/351 |
| 2002/0057691 | A1 * | 5/2002 | Enoki et al. .................. 370/392 |
| 2005/0083928 | A1 * | 4/2005 | Sivabalan et al. ............ 370/389 |
| 2006/0251074 | A1 * | 11/2006 | Solomon ....................... 370/392 |
| 2008/0298360 | A1 * | 12/2008 | Wijnands et al. ............. 370/389 |

OTHER PUBLICATIONS

Foreign Communication from a related counterpart application, PCT application PCT/US2012/028510, International Search Report dated May 7, 2012, 5 pages.
Foreign Communication from a related counterpart application, PCT application PCT/US2012/028510, Written Opinion dated May 7, 2012, 9 pages.
Shimoto, et al., "Procedures for Dynamically Signaled Hierarchical Label Switched Paths," RFC 6107, Feb. 2011, 30 pages.
So, et al., "Composite Link Framework in Multi Protocol Label Switching (MPLS)," draft-so-yong-rtgwg-cl-framework-03.txt, Feb. 3, 2011, 10 pages.
Bryant, S., Ed., et al., "Flow Aware Transport of Pseudowires Over an MPLS PSN," draft-ietf-pwe3-fat-pw-03.txt, Jan. 27, 2010, 20 pages.
Fu, X., et al., "GMPLS Extensions to Communicate Latency as a Traffic Engineering Performance Matric," draft-wang-ccamp-latency-te-metric-03, Mar. 14, 2011, 22 pages.

(Continued)

*Primary Examiner* — Minh-Trang Nguyen
(74) *Attorney, Agent, or Firm* — Conley Rose, P.C.; Grant Rodolph; Rayhao Chung

(57) ABSTRACT

An apparatus comprising an end point coupled to a peer end point via a composite link comprising a plurality of component links and configured to signal the peer end point to indicate an aggregated label switched path (LSP) established on the composite link and one of a plurality of data flow identifiers for the aggregated LSP, wherein the aggregated LSP and a data flow identifier field are signaled from the end point using a signaling protocol. Also disclosed is a method implemented by a network component comprising receiving using a receiver a message comprising a Type-Length-Value (TLV) that indicates that a LSP established on a composite link with a peer end point is an aggregated LSP, and receiving in the TLV a plurality of inner labels that correspond to a plurality of data flows of the aggregated LSP.

26 Claims, 8 Drawing Sheets

(56) References Cited

OTHER PUBLICATIONS

Kamite, Y., et al., "Framework and Requirements for Virtual Private Multicast Service (VPMS)," draft-ietf-l2vpn-vpms-frmwk-requirements-03.txt, Jul. 12, 2010, 27 pages.

Kompella, K., et al., "The Use of Entropy Labels in MPLS Forwarding," draft-kompella-mpls-entropy-label-01, Jul. 7, 2008, 17 pages.

Meyer, M., Ed., et al., "MPLS Traffic Engineering Soft Preemption," draft-ietf-mpls-soft-preemption-16.txt, Feb. 2, 2009, 15 pages.

Osborne, E., et al., "Component and Composite Link Membership in OSPF," draft-ospf-cc-stiv-00, Aug. 4, 2011, 8 pages.

Shimoto, K., Ed., et al., "Procedures for Dynamically Signaled Hierarchical Label Switched Paths," draft-ietf-ccamp-lsp-hierarchy-bis-05.txt, Oct. 16, 2008, 29 pages.

So, N., et al., "Framework for MPLS Over Composite Link," draft-so-yong-rtgwg-cl-framework-00, Feb. 16, 2010, 14 pages.

So., N., et al., "Composite Link Framework in Multi Protocol Label Switching (MPLS)," draft-so-yong-rtgwg-cl-framework-05, Mar. 7, 2012, 38 pages.

Stein, Y (J)., et al., "PW Bonding," draft-stein-pwe3-pwbonding-01.txt, Nov. 2, 2008, 13 pages.

"IEEE Standard for Local and Metropolitan Area Networks-Link Aggregation," IEEE 802.1 AX™, Nov. 3, 2008, 163 pages.

"Series G: Transmission Systems and Media, Digital Systems and Networks, Digital Networks-General Aspects, Unified Functional Architecture of Transport Networks," ITU-T G.800, Sep. 2007, 48 pages.

"Series Y: Global Information Infrastructure, Internet Protocol Aspects and Next-Generation Networks, Internet Protocol Aspects—Quality of Service and Network Performance, Internet Protocol Data Communication Service—IP Packet Tranfer and Availability Performance Parameters," ITU-T Y. 1540, Nov. 2007, 42 pages.

"Series Y: Global Information Infrastructure, Internet Protocols Aspects and Next-Generation Networks, Internet Protocol Aspects—Quality of Service and Network Performance, Network Performance Objectives for IP-based Services," ITU-T Y. 1541, Feb. 2006, 50 pages.

Andersson, L., et al., "The Multiprotocol Label Switching (MPLS) Working group Decision on MPLS Signaling Protocols," RFC 3468, Feb. 2003, 12 pages.

Andersson, L., Ed., et al., "Framework for Layer 2 Virtual Private Networks (L2VPNs)," RFC 4664, Sep. 2006, 44 pages.

Apostolopoulos, G., et al., QoS Routing Mechanisms and OSPF Extensions, RFC 2676, Aug. 1999, 51 pages.

Augustyn, W., Ed., et al., "Service Requirements for Layer 2 Provider-Provisioned Virtual Private Networks," RFC 4665, Sep. 2006, 33 pages.

Awduche, D., et al., "Requirements for Traffic Engineering Over MPLS," RFC 2702, Sep. 1999, 29 pages.

Awduche, D., et al., "RSVP-TE: Extensions to RSVP for LSP Tunnels," RFC 3209, Dec. 2001, 57 pages.

Bitar, N., Ed., et al., "Requirements for Multi-Segment Pseudowire Emulation Edge-to-Edge (PWE3)," RFC 5254, Oct. 2008, 27 pages.

Blake, S., et al., "An Architecture for Differentiated Services," RFC 2475, Dec. 1998, 36 pages.

Bradner, S., et al., "Key Words for Use in RFCs to Indicate Requirement Levels," RFC 2119, Mar. 1997, 3 pages.

Bryant, S., et al., "Pseudowire Emulation Edge-to-Edge (PWE3) Control Word for Use Over an MPLS PSN," RFC 4385, Feb. 2006, 12 pages.

Carugi, M., Ed., et al., "Service Requirements for Layer 3 Provider Provisioned Virtual Private Networks (PPVPNs)," RFC 4031, Apr. 2005, 50 pages.

Grossman, D., "New Terminology and Calrification for Diffserv," RFC 3260, Apr. 2002, 10 pages.

Hopps, C., "Analysis of an Equal-Cost Multi-Path Algorithm," RFC 2992, Nov. 2000, 8 pages.

Katz, D., et al., "Traffic Engineering (TE) Extensions to OSPF Version 2," RFC 3630, Sep. 2003, 14 pages.

Kent, S., et al., "Security Architecture for the Internet Protocol," RFC 4301, Dec. 2005, 102 pages.

Kompella, K., et al., "Link Bundling in MPLS Traffic Engineering (TE)," RFC 4201, Oct. 2005, 13 pages.

Kompella, K., et al., "Label Switched Paths (LSP) Hierarchy with Generalized Multi-Protocol Label Switching (GMPLS) Traffic Engineering (TE)," RFC 4206, Oct. 2005, 14 pages.

Kompella, K., Ed., et al., "Virtual Private LAN Service (VPLS) Using BGP for Auto-Discovery and Signaling," RFC 4761, Jan. 2007, 28 pages.

Lasserre, M., Ed., et al., "Virtual Private LAN Service (VPLS) Using Label Distribution Protocol (LDP) Signaling," RFC 4762, Jan. 2007, 31 pages.

Le Faucheur, F., Ed., et al., "Protocol Extensions for Support of Diffserv-Aware MPLS Traffic Engineering," RFC 4124, Jun. 2005, 38 pages.

Malts, A., "PPP Over SONET/SDH," RFC 2615, Jun. 1999, 11 pages.

Nagarajan, A., Ed., "Generic Requirements for Provider Provisioned Virtual Private Networks (PPVPN)," RFC 3809, 25 pages.

Pan, P., Ed., et al., "Fast Reroute Extensions to RSVP-TE for LSP Tunnels," RFC 4090, May 2005, 38 pages.

Rekhter, Y., et al., "Use of Provider Edge to provider Edge (PE-PE) Generic Routing Encapsulation (GRE) or IP in BGP/MPLS IP Virtual Private Networks," RFC 4797, Jan. 2007, 10 pages.

Rosen, E., et al., "Multiprotocol Label Switching Architecture," RFC 3031, Jan. 2001, 57 pages.

Rosen, E., et al., "BGP/MPLS IP Virtual Private Networks (VPNs)," RFC 4364, Feb. 2006, 47 pages.

Shenker, S., et al., "General Characterization Parameters for Integrated Service Network Elements," RFC 2215, Sep. 1997, 17 pages.

Sklower, K., et al., "The PPP Multilink Protocol (MP)," RFC 1717, Nov. 1994, 21 pages.

Swallow, G., et al., "Avoiding Equal Cost Multipath Treatment in MPLS Networks," RFC 4928, Jun. 2007, 8 pages.

Thaler, D., et al., "Multipath Issues in Unicast and Multicast Next-Hop Selection," RFC 2991, Nov. 2000, 9 pages.

Shand, M., et al., "IP Fast Reroute Framework," RFC 5714, Jan. 2010, 15 pages.

Andersson, L., et al., "Multiprotocol Label Switching (MPLS) Label Stack Entry: "EXP" Field Renamed to "Traffic Class" Field," RFC 5462, Feb. 2009, 9 pages.

Atlas, Ed., A., et al., "Basic Specification for IP Fast Reroute: Loop-Free Alternates," RFC 5286, Sep. 2008, 31 pages.

Frost, D., et al., "Packet Loss and Delay Measurement for MPLS Networks," RFC 6374, Sep. 2011, 52 pages.

Busi, Ed., I., et al., "Operations, Administration, and Maintenance Framework for MPLS-Based Transport Networks," RFC 6371, Sep. 2011, 62 pages.

Frost, Ed., D., et al., "MPLS Transport Profile Data Plane Architecture," RFC 5960, Aug. 2010, 15 pages.

Niven-Jenkins, Ed., B., et al., "Requirements of an MPLS Transport Profile," RFC 5654, Sep. 2009, 31 pages.

Bryant, Ed., S., et al., "Flow-Aware Transport of Pseudowires over an MPLS Packet Switched Network," RFC 6391, Nov. 2011, 19 pages.

Shiomoto, Ed., K., "Procedures for Dynamically Signaled Hierarchical Label Switched Paths," RFC 6107, Feb. 2011, 30 pages.

Fang, Ed., L., et al., "Security Framework for MPLS and GMPLS Networks," RFC 5920, Jul. 2010, 66 pages.

Bocci, Ed., M., et al., "MPLS Generic Associated Channel," RFC 5586, Jun. 2009, 19 pages.

Mannie, Ed., E., "Generalized Multi-Protocol Label Switching (GMPLS) Architecture," RFC 3945, Oct. 2004, 69 pages.

Aggarwal, R., "Advertising a Router's Local Addresses in OSPF Traffic Engineering (TE) Extensions," RFC 5786, Mar. 2010, 7 pages.

Farrel, Ed., A., et al., "Encoding of Attributes for MPLS LSP Establishment Using Resource Reservation Protocol Traffic Engineering (RSVP-TE)," RFC 5420, Feb. 2009, 22 pages.

Berger, Ed., L., et al., "Generalized Multi-Protocol Label Switching (GMPLS) Signaling Functional Description," RFC 3471, Jan. 2003, 34 pages.

Bocci, Ed., M., et al., "A Framework for MPLS in Transport Networks," RFC 5921, Jul. 2010, 56 pages.

(56) References Cited

OTHER PUBLICATIONS

Andersson, Ed., L., et al., "LDP Specification," RFC 5036, Oct. 2007, 135 pages.
Bryant, Ed., S., et al., Pseudo Wire Emulation Edge-to-Edge (PWE3) Architecture, RFC 3985, Mar. 2005, 42 pages.
Rosen, E., et al., "MPLS Label Stack Encoding," RFC 3032, Jan. 2001, 23 pages.
Meyer, Ed., M., et al., "MPLS Traffic Engineering Soft Preemption," RFC 5712, Jan. 2010, 13 pages.
Kompella, K., et al., "The Use of Entropy Labels in MPLS Forwarding," draft-kompella-mpls-entropy-label-02.txt, Mar. 6, 2011, 26 pages.
Kamite, Y., et al., "Framework and Requirements for Virtual Private Multicast Service (VPMS)," draft-ietf-12vpn-vpms-frmwk-requirements-04.txt, Jul. 11, 2011, 28 pages.
Bryant, Ed., S., "Flow Aware Transport of Pseudowires over an MPLS PSN," draft-ietf-pwe3-fat-pw-05, Oct. 22, 2010, 20 pages.

* cited by examiner

600

610

Sub-objects

| Type | Length | Sub-object content |

SIGNALING EXTENSION FOR A LABEL SWITCHED PATH OVER A COMPOSITE LINK

CROSS-REFERENCE TO RELATED APPLICATIONS

The present application claims the benefit of U.S. Provisional Patent Application No. 61/450,868, filed Mar. 9, 2011 by Lucy Yong and entitled "Signaling Extensions for a Label Switched Path Over a Composite Link," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths.

Some networks implement Internet Protocol (IP) and/or Multiprotocol Label Switching (MPLS) to route data (e.g., using packets of frames) between the network components. The IP directs data between network nodes based on IP addresses assigned to the network nodes and routing tables that comprise the addresses. The MPLS is a protocol that directs data from one network node to the next based on short path labels rather than network addresses, avoiding complex lookups in routing tables. Some networks also use Interior Gateway Protocol (IGP) routing protocol to exchange routing information (also referred to as signaling) within a network, network domain, or autonomous system (AS).

SUMMARY

In one embodiment, the disclosure includes an apparatus comprising an end point coupled to a peer end point via a composite link comprising a plurality of component links and configured to signal the peer end point to indicate an aggregated label switched path (LSP) established on the composite link and one of a plurality of data flow identifiers for the aggregated LSP, wherein the aggregated LSP and a data flow identifier field are signaled from the end point using a signaling protocol.

In another embodiment, the disclosure includes a network component comprising a receiver unit configured to receive a signal indicating an aggregated LSP associated with a composite link that comprises a plurality of component links, and a plurality of identifiers for a plurality of data flows of the aggregated LSP that are associated with the component links, a logic unit configured to map each of the identifiers to one corresponding link of the component links, and a transmitter unit configured to forward the data flows on the corresponding component links and send the corresponding identifiers in a plurality of inner labels below a top LSP label in the data flow's packets.

In yet another embodiment, the disclosure includes a method implemented by a network component comprising receiving using a receiver a message comprising a Type-Length-Value (TLV) that indicates that a LSP established on a composite link with a peer end point is an aggregated LSP, and receiving in the TLV a plurality of inner labels that correspond to a plurality of data flows of the aggregated LSP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a schematic diagram of an embodiment of a recorded route object.

FIG. 7 is a schematic diagram of an embodiment of a sub-object TLV.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A composite link is specified in the Internet Engineering Task Force (IETF) publication draft-ietf-rtgwg-cl-requirement-03, entitled "Requirements for MPLS Over a Composite Link," which is incorporated herein by reference. The composite link may comprise a set of homogeneous component links (e.g., substantially similar links), non-homogeneous component links, or both. Using the composite link in MPLS networks may substantially reduce the amount of link state advertisement (LSA) messages and reduce network instability, which may also improve network scalability. A composite link may depend on the component links to transport traffic over the composite link. Disclosed herein is a system and method for advertising the composite link in a network, such as an IP or MPLS network. The composite link may be advertised as a link using IGP and/or IGP-Traffic Engineering (IGP-TE). The system and method may comprise signaling protocol extensions that may be used to set up a LSP over a composite link.

Figure 1:
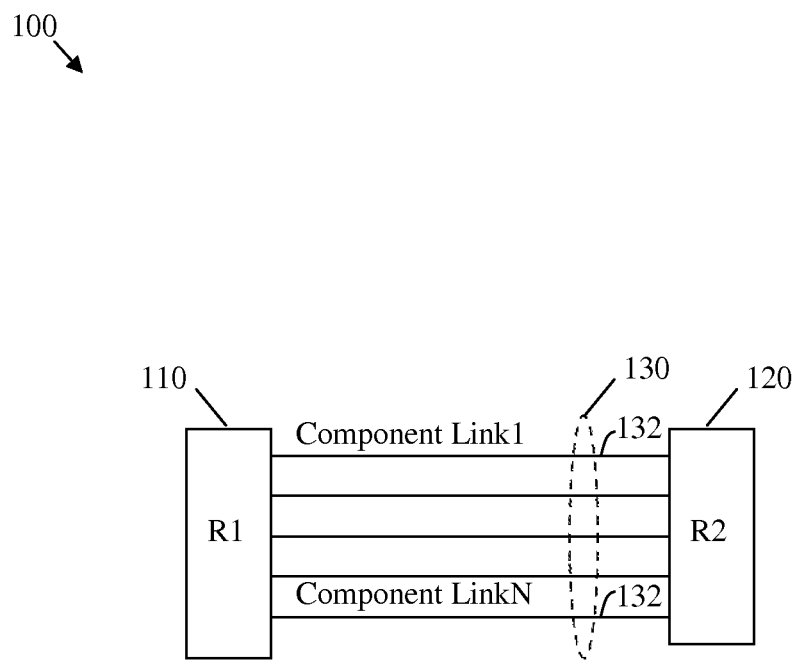
FIG. 1 is a schematic diagram of an embodiment of a composite link architecture.

FIG. 1 illustrates an embodiment of a composite link architecture 100, which may be used in an IP network, MPLS network, other types of networks, or combinations thereof. The composite link architecture 100 may comprise a first node 110 (labeled R1), a second node 120 (labeled R2), and a composite link 130 positioned between the first node 110 and the second node 120. The composite link 130 may comprise a plurality of component links 132 (e.g., component link1, . . . , component linkN, where N is and integer greater than one). The components of the composite link architecture 100 may be arranged as shown in FIG. 1.

The first node 110 and the second node 120 may be any network nodes, components, or devices that are configured to transfer data, e.g., IP/MPLS packets or frames, in the network. The first node 110 and the second node 120 may also exchange data between each other via the composite link 130. For instance, the first node 110 and the second node 120 may comprise switches, bridges, routers, or combinations thereof. The composite link 130 may be a bidirectional link configured to forward unidirectional flows or bidirectional flows between the first node 110 and the second node 120.

The component links 132 may be bidirectional links configured in both directions. For example, as described in draft-ietf-rtgwg-cl-requirment-03, the component links 132 may comprise physical links, bidirectional LSP tunnels, bidirectional LSP tunnels provided by a Generalized Multi-Protocol Label Switching (GMPLS) based lower server layer, or combinations thereof. The component links 132 may also comprise other types of network links that may be established between two nodes. The component links 132 may have the same or different characteristics, such as the same or different capacity or bandwidth, transport latency, jitter, other characteristics, or combinations thereof. As such, the composite link 130 may comprise homogenous component links 132 and/or non-homogenous component links 132, which may be different than a link bundle architecture described in IETF Request for Comments (RFC) 4201, which is incorporated herein by reference.

In an embodiment, the composite link 130 may be configured to carry an aggregated LSP using a signaling extension in an IP/MPLS network. The aggregated LSP may comprise a plurality of data flows (on the component links 132) and its bandwidth may be larger than available bandwidth in any component link within the composite link 130. Since forwarding the packets of a data flow on multiple component links 132 may cause the packets to arrive out of order, the packets corresponding to the same data flow in an aggregated LSP may be placed on the same component link 132. The aggregated LSP may comprise a plurality of data flows that may be distinguished by a corresponding flow identifier label, also referred to herein as an inner label, which may be added to each data flow. One or more inner labels may be placed below a LSP label, also referred to herein as a top label, in a packet. Thus, both the top label and the inner label(s) may be used to distribute the aggregated LSP packets over the different component links 132.

The signaling extension may be implemented using a signaling flag or a TLV, e.g., in a Resource Reservation Protocol-Traffic Engineering (RSVP-TE) or Label Distribution Protocol (LDP) signaling message, to indicate that the established LSP (on the composite link 130) is an aggregated LSP. The signaling message may also indicate which inner label(s) may be used for load distribution on the composite link 130, e.g., data flow distribution on the component links 132. For instance, an entire label stack or one or two inner labels may be used below the top label. When the signaling message for an aggregated LSP is received on a non-composite link, the flag or TLV comprising the inner labels or label stack is ignored, and the established LSP may be treated as non-aggregated LSP. The signaling described above may be implemented by network components associated with the links and LSPs, such as the first node 110 and the second node 120.

Further, a second signaling extension may be implemented to place a bidirectional LSP on the same component link 132 (in both directions between the first node 110 and the second node 120). Typically, the distribution function on a first router (e.g., the first node 110) of the composite link 130 may place a LSP on a component link without synchronization or sync-up with its peer (e.g., the second node 120). For example, each of the two nodes may place a bidirectional LSP on different component links 132. However, in some scenarios, the network operator may want to place a bidirectional LSP on the same component link 132. This may require that the two end points (the first node 110 and the second node 120) of the composite link 130 select the same component link 132 for placing the bidirectional LSP. The second signaling extension may be implemented using RSVP-TE, RSVP, or LDP to allow this function.

In RSVP-TE and RSVP, when a first end point of the composite link 130 receives a path request (PATH) message (e.g., from a previous hop in the network) for establishing a bidirectional LSP, the first end point may add multiple TLVs into the PATH message for all primary component links 132 that are qualified or candidate for the bidirectional LSP. The PATH message may be received from the second end point of the composite link 130 or the network. The first end point may then send the PATH message to the second end point. When the second end point receives the PATH message, the second end point may maintain a list for the candidate component links 132 indicated in the PATH message, remove the corresponding TLVs in the PATH message, and forward the PATH message to the next hop. The first end point of the composite link may allow a bi-directional LSP on any component link. In this case, the first end point may not attach to component link TLVs into the PATH message.

Subsequently, when the second end point receives a path reserve (RESV) message for the bidirectional LSP, the second end point may check the maintained list of candidate component links 132 and select one of the candidate component links 132, e.g. based on the current component links conditions. The second end point may add a TLV for the selected component link 132 into the RESV message and send the RESV message to the first end point. When the first end point receives the RESV message, the first end point may place the bidirectional LSP on the component link 132 indicated in the RESV message, remove the TLV from the RESV message, and forward the RESV message to the next hop. The second end point may also place the reversed direction LSP on the same component link.

A similar approach may be implemented using LDP signaling. As such, the first end point may place multiple TLVs for the candidate component links 132 into a label mapping message, and send the message to the second end point. The second end point may then receive the message, select one of the candidate component links 132, and set a TLV for the selected component link 132 into a label mapping message that is returned to the first end point. The first end point may then place the bidirectional LSP on the component link 132 indicated in the returned label mapping message, remove the TLV, and forward the message to the next hop.

A third signaling protocol extension may also be used to indicate LSP performance metrics in a LSP request message. The composite link 130 may comprise a set of non-homogeneous component links 132, which may have different link performances. A composite link LSA message may be used to announce the possible performance metrics for the component links 132, e.g., in term of cost. The first end point of the composite link may place the LSP to a component link with a cost is less or about equal to the cost value indicated in the message.

Figure 2:
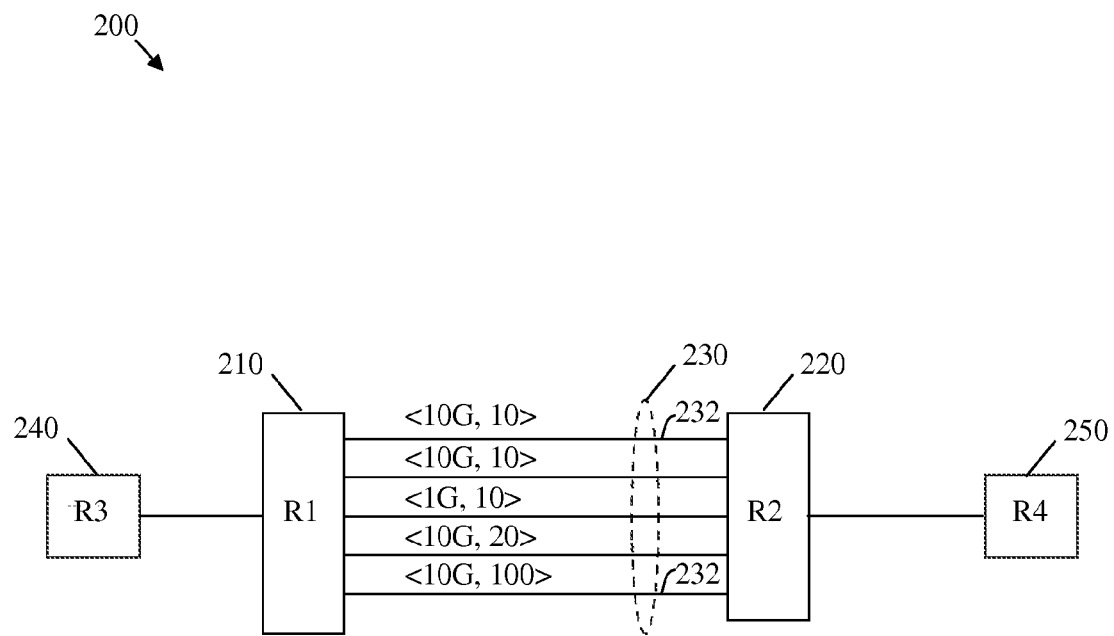
FIG. 2 is a schematic diagram of an embodiment of a composite link system.

FIG. 2 illustrates an embodiment of a composite link system 200, which may implement the composite link architecture 100 and any of the signal extensions described above. The composite link system 200 may comprise a first node 210 (labeled R1), a second node 220 (labeled R2), and a composite link 230 positioned between the first node 210 and the second node 220. The composite link 230 may comprise a plurality of component links 232 (e.g., component link1, . . . , component linkN). The components of the composite link system 200 may be configured substantially similar to the corresponding components of the composite link architecture 100.

Additionally, the composite link system may comprise a third node 240 (labeled R3) coupled to the first node and a fourth node 250 (labeled R4) coupled to the second node. The third node 240 and the fourth node 250 may be any network nodes, components, or devices that are configured to transfer data, e.g., IP/MPLS packets or frames, in the network. The third node 240 and the fourth node 250 may be configured similar to the first node 210 and the second node 220. The third node 240 and the fourth node 250 may exchange data with the first node 210 and the second node 220, respectively, via non-composite links or composite links similar to the composite link 230. The components of the composite link system 200 may be arranged as shown in FIG. 2.

For example, the composite link 230 may comprise about five component link 232. There component links 232 may belong to about three sets or groups, e.g., based on cost. The cost may represent the cost of network resources required to setup the corresponding component link 232. The first group may comprise about three component links 232 that have a first cost of about 10. The first group may comprise first and second component links 232 that have an available bandwidth of about 10 Gigabit (G), and a third component link 232 that has an available bandwidth of about 1 G. The second group may comprise about one component link 232 that has a second cost of about 20 and an available bandwidth of about 10 G. The third group may comprise about one component link 232 that has a third cost of about 100 and an available bandwidth of about 10 G.

To advertise the composite link 230, IGP-TE signaling may be used. The IGP-TE signaling may advertise a plurality of composite link interface identifiers (IDs) (e.g., both local and remote IDs) corresponding to the groups of component links 232: <10, 21 G, 10 G>, <20, 10 G, 10 G>, and <500, 10 G, 10 G>. Each composite link interface ID may indicate about three sets of TE parameters for the corresponding group. The first parameter in each ID may indicate the cost of the corresponding group. The second parameter in each ID may indicate the total available bandwidth for the group, which may be the sum of the available bandwidth for each component link 232 in the group. The third parameter in each ID may indicate the largest LSP or link bandwidth that the component links 232 in the group may carry.

When a head-end node or end point signals a LSP over the composite link 230, the end point may use the third extension to specify the LSP performance constraint over the composite link 230. For example, the end point may signal a LSP over the composite link 230 that has a cost of 10. Thus, a LSP may be placed (e.g., by the first node 210 or the second node 220) on one of the component links 232 that have a cost of 10 or less, e.g., in the first component link group described above. Alternatively, the end point may signal a LSP over the composite link 230 that has a cost of 20. Thus, a LSP may be placed on one of the component links 232 that have a cost of about 10 or 20, e.g., in the first or the second component link group described above. This LSP signaling may be implemented using RSVP-TE or LDP. Both the RSVP-TE and LDP protocol may require an extension that allows an end point node to indicate the performance metric constraint over a composite link. For instance, a route object may be used to add a TLV for this purpose.

The composite link architecture 100 and the composite link system 200 may also support a fourth signaling extension to enable a composite link local recovery function. For instance, a component link (e.g., component link 232) in a composite link (e.g., component link 230) may fail, e.g., independently from the other links. The routers (e.g., the first node 210 and the second node 220) at the composite link may need to perform local recovery for the impacted traffic that is assigned to the failed component link. The two routers on the composite link may use the fourth signaling extension to sync up link reassignment that meets the LSP requirement. The link reassignment message may comprise reassigning the impacted data flows or LSPs to one or more operating component links of the same composite link or independent of the composite link. The traffic reassignment may be temporary until the failed component link is fixed. In this case, the signaling extension may also be used to reassign the traffic to the fixed component link.

The signaling extension may also enable an optimization function (for traffic distribution) that may be performed by the network operator. For example, the network operator may want to optimize the load balance or energy saving over a composite link in a maintenance window. Thus, some LSPs on the composite link may be reassigned to different component links, which may require some sync-up functions between the two end points of the composite link. Such optimization functions may be local functions to the composite link's end points, and hence introducing such functions may not cause network-wide change. After the optimization, the composite link state may be updated with a new total available bandwidth value and/or a largest LSP bandwidth value. To reassign a bidirectional LSP to the same component link, a RSVP-TE or LDP signaling extension may be used. A Hello Protocol may also be used for the composite link for sync-up purpose.

A fifth protocol extension, e.g. to the IETF RFC 4379, may be used for operation, administration, and maintenance (OAM) purpose. The protocol extension may be used to perform a path trace function. The function may enable a head-end node or end point of the composite link to trace the path for a LSP originating from the end point. When a LSP is configured over a composite link, the end point node may need to be aware of both the composite link and the component link associated with the LSP. Hence, the singling extension (to the RFC 4379) may be needed to indicate that the LSP is established over the composite link and the component link. The signaling may indicate both a composite link ID and a component link ID in one or more TLVs. In the case of an aggregated LSP, a list of component links that is configured to transport the aggregated LSP (e.g., the different data flows of the aggregated LSP) may be signaled using the signaling extension. Additionally, in the case of using a ping function, the signaling extension may be used by an end point to indicate which LSP the end point pings for. Thus, the ping message may be sent in the composite link over the component link that is associated with the signaled or indicated LSP. In the case where the end point pings a data flow within an aggregated LSP, the ping may be sent over the same component link associated with the signaled data flow.

Figure 3A:
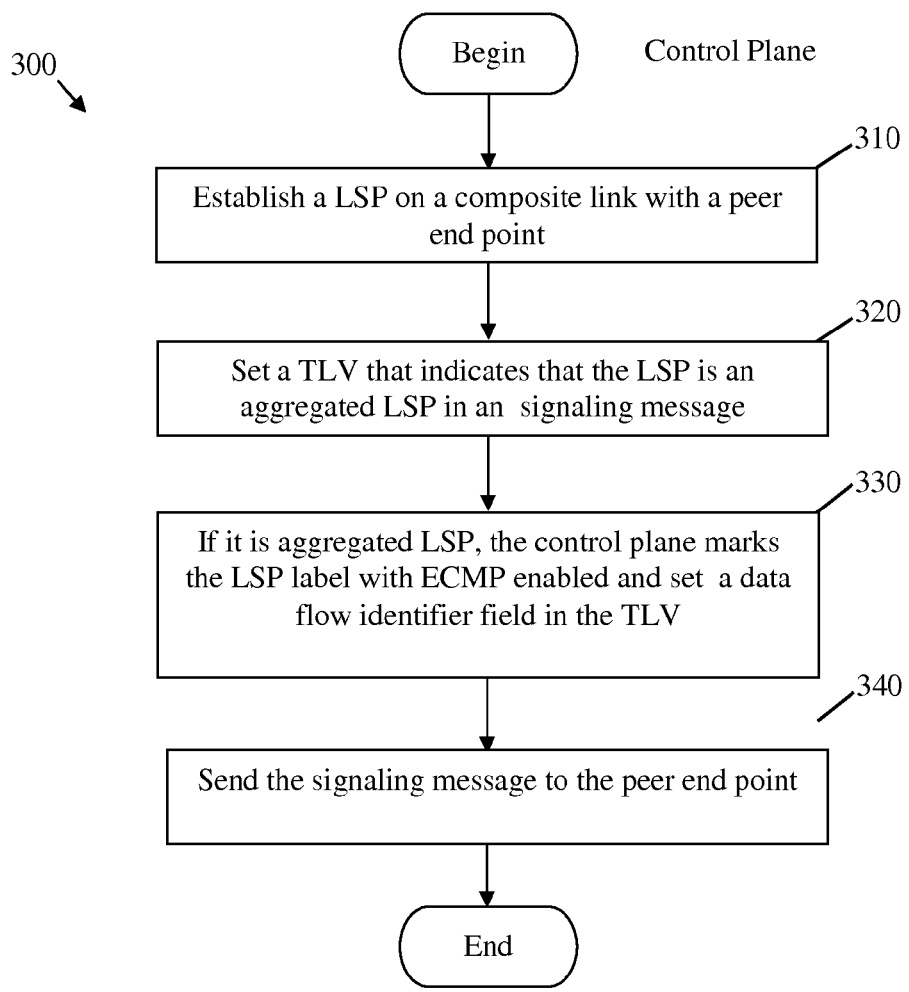
FIGS. 3a and 3b are flowcharts of an embodiment of a composite link signaling and forwarding method.
Figure 3B:
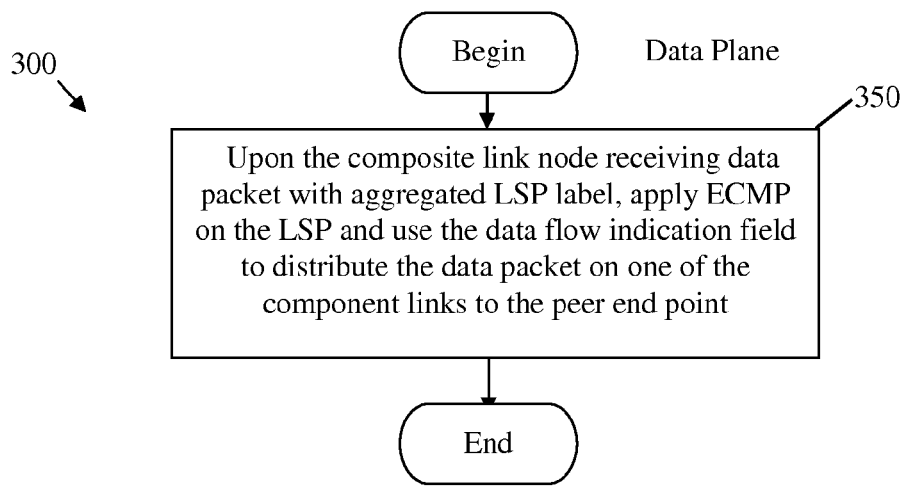

FIGS. 3a and 3b illustrate an embodiment of a composite link signaling and forwarding method 300, which may be used to establish an aggregated LSP or a single LSP on a composite link, e.g., the composite link 230 in the composite link system 200. The composite link signaling and forwarding method 300 may also be used to forward a plurality of data flows of the aggregated LSP on the composite link. The composite link signaling and forwarding method 300 may be implemented by any of the two end points (or both) of the composite link, e.g., the first node 210 and/or the second node 220. FIG. 3a shows a part of the method 300 that may be implemented at a control plane. FIG. 3b shows another part of the method 300 that may be implemented at a data plane. The control plane may signal the LSP first to allow the first (signaling) node to select the component link and to configure the data plane properly. The first node may then send LSP packets at the data plane.

The composite link signaling and forwarding method 300 may begin at block 310, where a LSP may be established on a composite link with a peer end point. For example, the first node 210 may establish a LSP on the composite link 230 with the second node 220. At block 320, a TLV that indicates that the LSP is an aggregated LSP may be set in a signaling message (e.g., an IP/MPLS signaling message). The first node 210 may add a TLV to the signaling message that indicates that the established LSP with the second node 220 is an aggregated LSP that comprises a plurality of data flows. The signaling message may be a RSVP or LDP message. At block 330, the control plane may mark the aggregated LSP as ECMP enabled and set a data flow identifier field associated with the LSP label. The first node 210 may also add to the signaling message the inner labels that may be used as data flow identifiers for the different flows corresponding to the aggregated LSP. At block 340, the IGP signaling message may be sent to the peer end point. The first node 210 may send the signaling message to the second node 220 using a signaling protocol, in which the data flow identifier field is indicated in use of entire label stack or use of the one or two inter labels under the outer label. The blocks 310 to 340 represent control plane functions.

At block 360, ECMP may be applied to the data flow packets in an aggregated LSP identified by the LSP label. The ECMP may use the data flow indication field to determine the component link that carries the packet over. Sending the packets of each data flow on a single corresponding component link may prevent or reduce the chances of the packets from arriving out of order to the peer end point. Similarly, the peer end point may return the packets of each data flow on the same single corresponding component link that is associated with the inner labels in the returned packets. The block 350 represents data plane functions.

Figure 4:
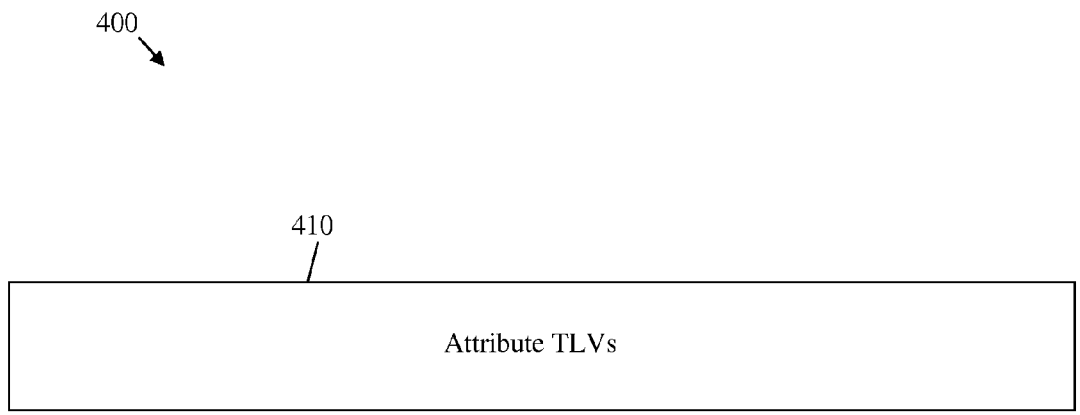
FIG. 4 is a schematic diagram of an embodiment of a LSP optional attributes object.

FIG. 4 illustrates an embodiment of a LSP optional attributes (LSP-OPTIONAL-ATTRIBUTES) object 400 that may be used to support at least some of the RSVP-TE signaling extensions described above. The LSP-OPTIONAL-AT-TRIBUTES object 400 may be an extension to the RSVP-TE signaling specified in RFC 4420, which is incorporated herein by reference. The LSP-OPTIONAL-ATTRIBUTES object 400 may be used for carrying LSP optional attributes for transit Label Switch Routers (LSRs). If a transit LSR does not recognize the LSP-OPTIONAL-ATTRIBUTES object 400, the LSR may ignore the LSP-OPTIONAL-ATTRIBUTES object 400. When a transit LSR processes the LSP-OPTIONAL-ATTRIBUTES object 400 and does not recognize or support the attribute(s) indicated in the object, the LSR may ignore the LSP-OPTIONAL-ATTRIBUTES object 400. When a transit LSR support a composite link and/or configure a composite link, the LSR may process the LSP-OPTIONAL-ATTRIBUTES object 400. The LSP-OPTIONAL-AT-TRIBUTES object 400 may comprise one or more attributes TLVs 410 that indicate LSP optional attributes for the composite link and/or one or more component links in the composite link.

Figure 5:
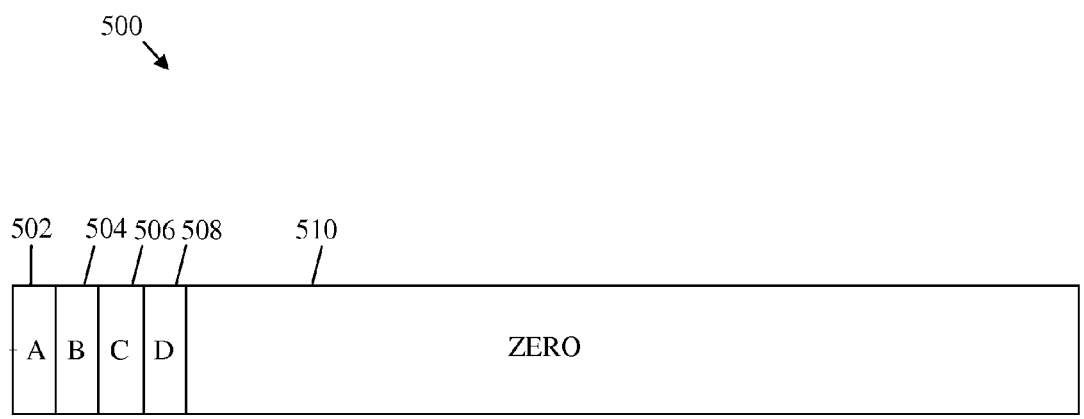
FIG. 5 is a schematic diagram of an embodiment of an attribute TLV.

FIG. 5 illustrates an embodiment of an attribute TLV 500 that may correspond to any of the attribute TLVs 410 in the LSP-OPTIONAL-ATTRIBUTES object 400. The attribute TLV 500 may comprise an aggregated LSP (A) bit 502, a bidirectional LSP (B) bit 504, a Least filled component link (C) bit 506, a most filled component (D) bit 508, and a zero padded (ZERO) field 510. The A bit 502 may be set (e.g., to about one) to indicate an aggregated LSP. If the A bit 502 is not set (e.g., set to about zero), then the LSP may be a single LSP. The B bit 504 may be set (e.g., to about one) to indicate a bidirectional LSP. If the B bit 504 is not set (e.g., set to about zero), then the LSP may be a unidirectional LSP. The C bit 506 may be set to indicate using the least filled component link. If the C bit 506 is not set, then the LSP may be placed on the component link that does not have least the traffic load at the request time. The D bit 508 may be set to indicate using the most filled component link. If the D bit 508 is not set, then the LSP may be placed on the component link that does not have the highest traffic load at the request time. The A, C, and D bits may be mutually exclusive, where using and setting one of the bits may exclude using the others. The ZERO field 510 may comprise a plurality of zeros and may be ignored when received.

When the LSP is a bidirectional LSP, an ingress LSR router associated with a composite link may insert one or more preferred component links for forwarding traffic on the composite link using a recorded route object. FIG. 6 illustrates an embodiment of a recorded route object 600 that may be used as a signaling extension to RFC 3209, which is incorporated herein by reference. The recorded route object 600 may be assigned a class equal to about 21 (Class=21) and a class type of about two (C-Type=2), or values assigned by the Internet Assigned Numbers Authority (TANA). The recorded route object 600 may comprise a plurality of sub-objects 610, which may be associated with a plurality of corresponding component links.

FIG. 7 illustrates an embodiment of a sub-object 700 that may correspond to any of the sub-objects 610 of the recorded route object 600. The sub-object 700 may comprise a Type field 704, a Length field 706, and a sub-object content field 708 The Type field 704 may indicate the type of content in the sub-object content field 708. For instance, the Type filed 704 may be set to about one if the content exchanged on the component link associated with the sub-object 700 is IP version four (IPv4) content. Alternatively, the Type filed 704 may be set to about two if the content exchanged on the component link associated with the sub-object 700 is IP version six (IPv6) content. The Length field 706 may indicate the total length of the sub-object 600, e.g., in bytes. The indicated length value may be a multiple of about four. The sub-object content field 708 may list the component link interface's local and remote addresses with specified type. The component link may be used to carry the LSP.

For a bidirectional LSP, an ingress node associated with a composite link may use the recorded route object 600 to list possible component links for the LSP, e.g., in a PATH message. The egress node associated with the composite link may choose one of the listed component links and may also use the recorded route object 600 to encode the selected component link, e.g., in a RESV message. For a LSP trace request, the ingress node associated with the composite link may use the recorded route object 600 to encode the component links that may be used to carry the LSP. For a single LSP, only one component link may be used. For an aggregated LSP, one or more component links may be used. The recorded route object 600 may be sent in a PATH message or a RESV message.

Figure 8:
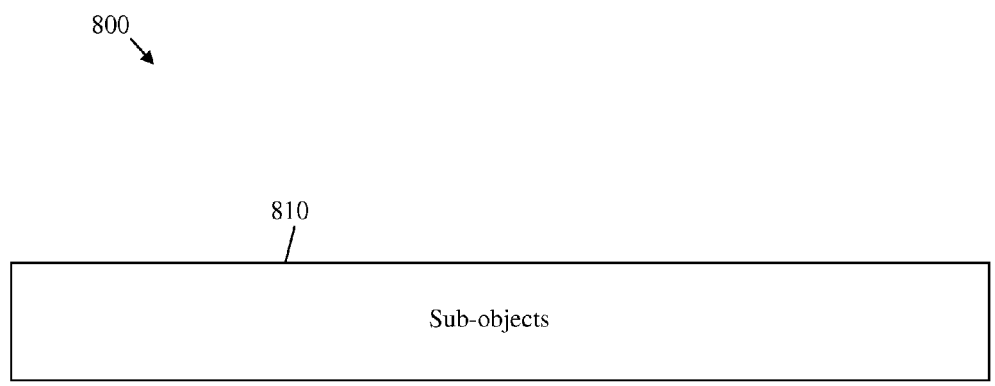
FIG. 8 is a schematic diagram of an embodiment of an explicit route object.

FIG. 8 illustrates an embodiment of an explicit route object 800 that may also be used as a signaling extension to RFC 3209. The explicit route object 800 may allow a head-end node to signal a LSP performance objective over a composite link. The explicit route object 800 may be assigned a class equal to about 20 (Class=20) and a class type of about three (C-Type=3), or the values assigned by IANA The explicit route object 800 may comprise a plurality of sub-objects 810, which may be associated with a plurality of corresponding component links.

Figure 9:
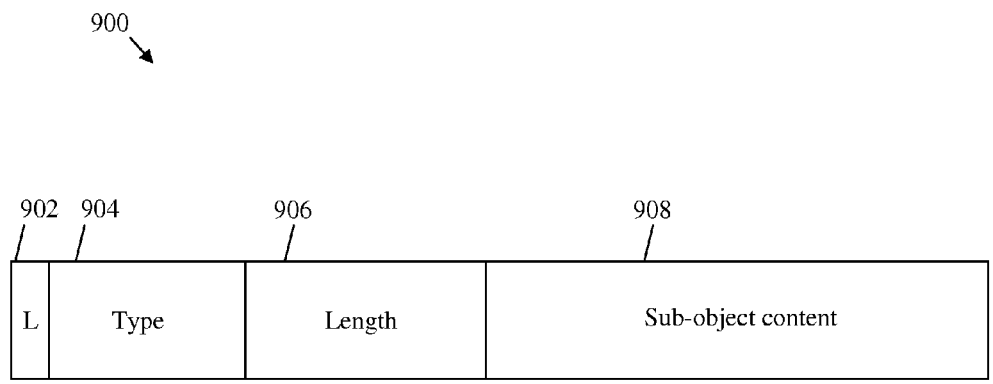
FIG. 9 is a schematic diagram of another embodiment of a sub-object TLV.

FIG. 9 illustrates an embodiment of a sub-object 900 that may correspond to any of the sub-objects 810 of the explicit route object 800. The sub-object 900 may comprise a link (L) bit 902, a Type field 904, a Length field 906, and a sub-object content field 908. The L bit 902 may be configured as defined in RFC 3209. The composite link may comprise physical links or logical links, and it is recommended to set L bit as a loose hop. The Type field 904 may indicate the type of content in the sub-object content field 908. For instance, the Type field 904 may be set to about one if the sub-object content field 908 comprises a cost metric. Alternatively, the Type field 904 may be set to about two if the sub-object content field 908 comprises a delay parameter, e.g., in micro seconds. The Length field 906 may be configured substantially similar to the Length field 706.

When a composite link associated node receives the explicit route object 800, e.g., in a PATH message comprising a C-Type of about three and a Type field 904 (in the sub-object 900) set to about one, the node may place the LSP on the component link that has a cost less than or about equal to the number or value indicated in the sub-object content field 908. When a composite link associated node receives the explicit route object 800, e.g., in a PATH message comprising a C-Type of about three and a Type field 904 (in the sub-object 900) set to about two, the node may place the LSP on the component link that has a delay less than or about equal to the delay value indicated in the sub-object content field 908. The composite link associated node may remove the explicit route object 800 in a received PATH message prior to sending to the PATH message to a next hop.

Figure 10:
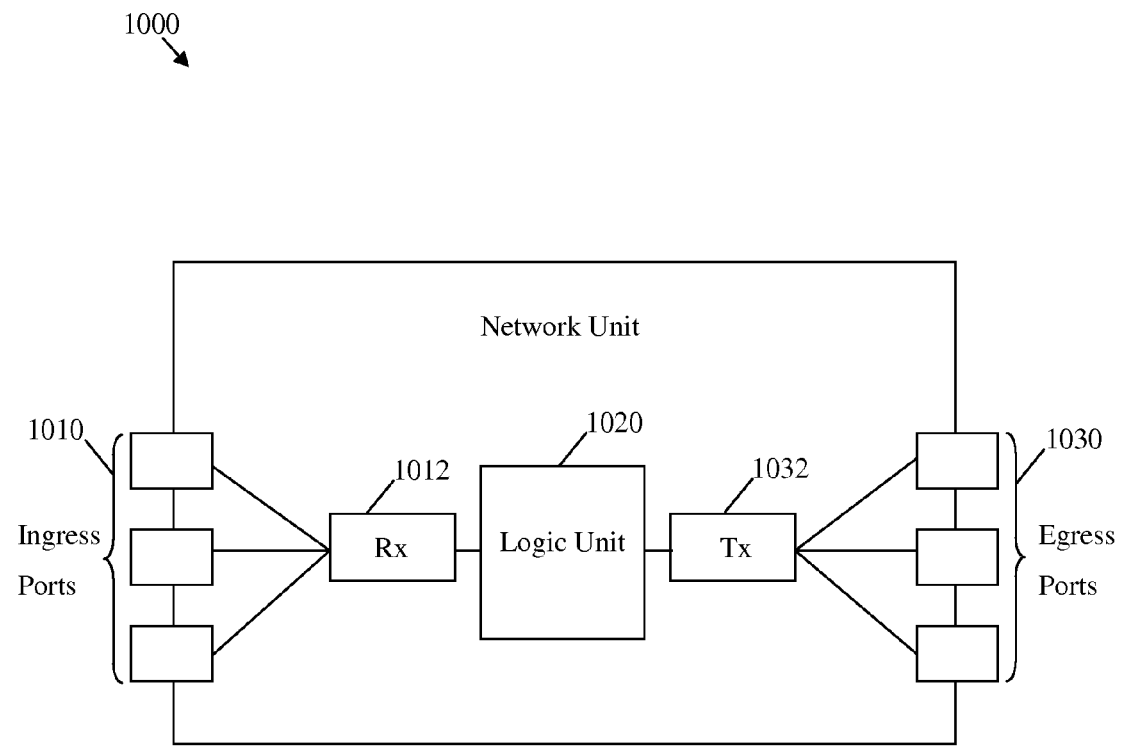
FIG. 10 is a schematic diagram of an embodiment of a transmitter/receiver unit.

FIG. 10 illustrates an embodiment of a transmitter/receiver unit 1000, which may be located at or coupled to any of the components described above. The transmitter/receiver unit 1000 may be any device that transports data through the network. For instance, the transmitter/receiver unit 1000 may correspond to or may be located in any of the network nodes described above, e.g., the first node 210 and the second node 220. The network unit 1000 may comprise one or more ingress ports or units 1010 coupled to a receiver (Rx) 1012 for receiving signals and frames/data from other network components. The network unit 1000 may comprise a logic unit 1020 to determine which network components to send data to. The logic unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, logic unit 1020, and transmitter 1032 may also implement or support the composite link architecture, system, and method described above. The components of the network unit 1000 may be arranged as shown in FIG. 10.

Figure 11:
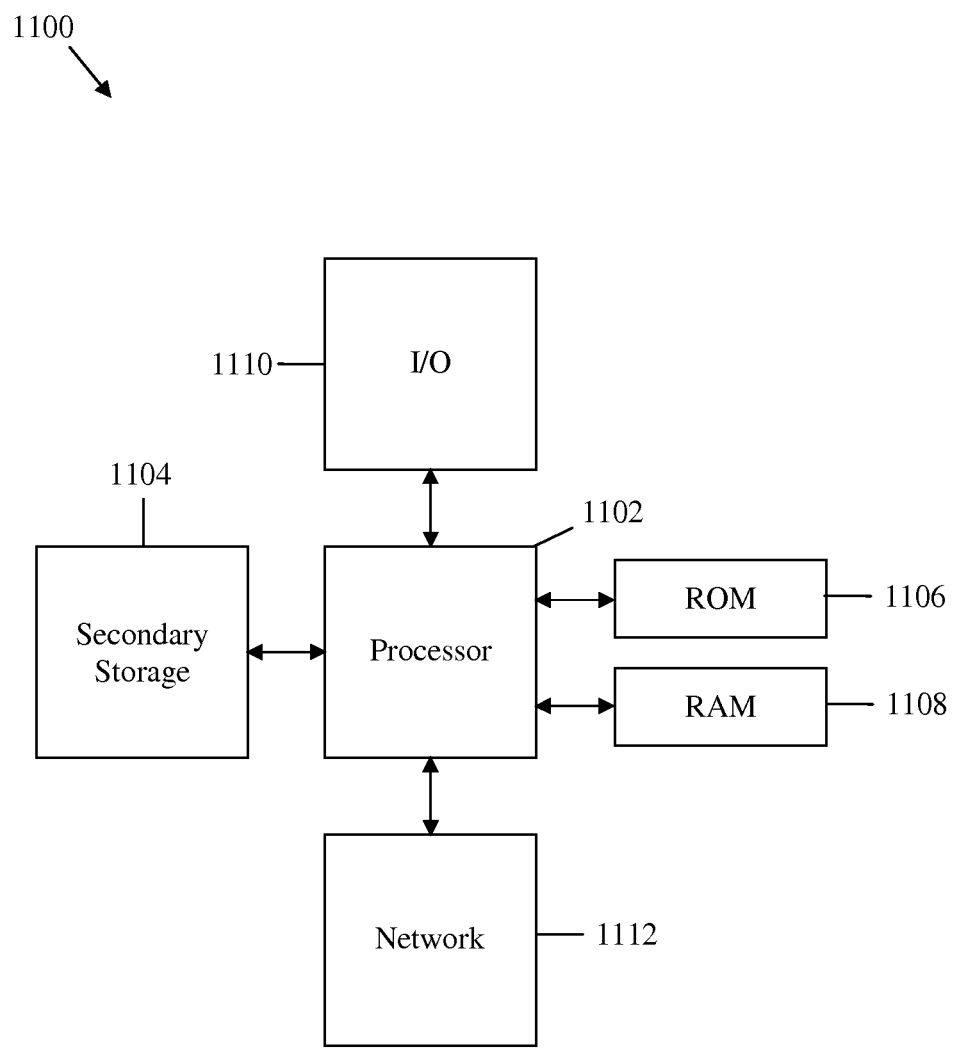
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs) and/or digital signal processors (DSPs).

The secondary storage 1104 is typically comprised of one or more disk drives or erasable programmable ROM (EPROM) and is used for non-volatile storage of data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a receiver unit configured to receive a signal indicating an aggregated label switched path (LSP) associated with a composite link that comprises a plurality of component links, and a plurality of identifiers for a plurality of data flows of the aggregated LSP that are associated with the component links;
a logic unit configured to map each of the identifiers to one corresponding link of the component links; and
a transmitter unit configured to forward the data flows on the corresponding component links and send the corresponding identifiers in a plurality of inner labels below a top LSP label in the data flow's packets,
wherein the receiver unit is further configured to receive a second signal indicating a bidirectional LSP on one of the component links, and wherein the transmitter is further configured to indicate in a return message a plurality of candidate links from the component links for the bidirectional LSP, and
wherein the identifiers identify the data flows to which a plurality of data packets within the aggregated LSP belong.

2. The network component of claim 1, wherein the second signal is received in a PATH message using Resource Reservation Protocol (RSVP), and wherein the candidate links are indicated in a plurality of Type-Length-Values (TLVs) in a return PATH message.

3. A network component comprising:
a receiver unit configured to receive a signal indicating an aggregated label switched path (LSP) associated with a composite link that comprises a plurality of component links, and a plurality of identifiers for a plurality of data flows of the aggregated LSP that are associated with the component links;
a logic unit configured to map each of the identifiers to one corresponding link of the component links; and
a transmitter unit configured to forward the data flows on the corresponding component links and send the corresponding identifiers in a plurality of inner labels below a top LSP label in the data flow's packets,
wherein the transmitter is further configured to send a second signal indicating a plurality of candidate links from the component links for a bidirectional LSP, and wherein the receiver is further configured to receive a return message indicating a selected link from the candidate links, and
wherein the identifiers identify the data flows to which a plurality of data packets within the aggregated LSP belong.

4. The network component of claim 3, wherein the second signal is sent in a label mapping message using Distribution Protocol (LDP), wherein the candidate links are indicated in a plurality of Type-Length-Values (TLVs) in the label mapping message, and wherein the return message is a return label message.

5. A network component comprising:
a receiver unit configured to receive a signal indicating an aggregated label switched path (LSP) associated with a composite link that comprises a plurality of component links, and a plurality of identifiers for a plurality of data flows of the aggregated LSP that are associated with the component links;
a logic unit configured to map each of the identifiers to one corresponding link of the component links; and
a transmitter unit configured to forward the data flows on the corresponding component links and send the corresponding identifiers in a plurality of inner labels below a top LSP label in the data flow's packets,
wherein the receiver unit is further configured to receive a second signal indicating a plurality of LSP performance metrics for the component links, and
wherein the identifiers identify the data flows to which a plurality of data packets within the aggregated LSP belong.

6. The network component of claim 5, wherein the LSP performance metrics correspond to a plurality of non-homogeneous component links.

7. The network component of claim 5, wherein the LSP performance metrics correspond to a plurality of component links that are grouped based on cost.

8. The network component of claim 7, wherein the LSP performance metrics for each group of component links are indicated using a plurality of parameters that include a cost of the corresponding group, a total available bandwidth of the corresponding group, and a largest LSP bandwidth of the component links in the corresponding group.

9. The network component of claim 5, wherein the second signal is sent using a Resource Reservation Protocol (RSVP).

10. The network component of claim 5, wherein the second signal is sent using a Label Distribution Protocol (LDP).

11. A method implemented by a network component comprising:
receiving using a receiver message comprising a Type-Length-Value (TLV) that indicates that a label switched path (LSP) established on a composite link with a peer end point is an aggregated LSP;
receiving in the TLV a plurality of inner labels that correspond to a plurality of data flows of the aggregated LSP;
removing the TLV from the message if the message is received on a non-composite link; and
treating the aggregated LSP as a non-aggregated LSP.

12. A method implemented by a network component comprising:
receiving using a receiver message comprising a Type-Length-Value (TLV) that indicates that a label switched path (LSP) established on a composite link with a peer end point is an aggregated LSP;
receiving in the TLV a plurality of inner labels that correspond to a plurality of data flows of the aggregated LSP;
receiving a Resource Reservation Protocol (RSVP) PATH message comprising one or more TLVs that indicate a plurality of candidate component links of the composite link for establishing a bidirectional LSP;
maintaining a list of the indicated candidate component links;
removing the TLVs from the RSVP PATH message; and
forwarding the RSVP PATH to a next hop.

13. The method implemented by the network component of claim 12, wherein the RSVP PATH message comprises a LSP optional attributes object that comprises at least one attribute TLV comprising an aggregated LSP (A) bit that is set to indicate an aggregated LSP or a single LSP, a bidirectional LSP (B) bit that is set to indicate a bidirectional LSP or a unidirectional LSP, and a zero padded field.

14. The method implemented by the network component of claim 12, wherein the RSVP PATH message comprises a recorded route object that has a class equal to about 21 and a class type of about two and that comprises at least one sub-object comprising a link (L) bit, a Type field, a Length field, and a sub-object content field, wherein the L bit is set to indicate a corresponding candidate component link, and wherein the Type field is set to about one if the sub-object content field comprises Internet Protocol (IP) version four (IPv4) traffic that is carried on the corresponding candidate component link or is set to about two if the sub-object content field comprises IP version six (IPv6) traffic that is carried on the corresponding candidate component link.

15. The method implemented by the network component of claim 12, wherein the RSVP PATH message comprises an explicit route object that has a class equal to about 20 and a class type of about three and that comprises at least one sub-object comprising a Type field, a Length field, and a sub-object content field, and wherein the Type field is set to about one if the sub-object content field comprises a cost metric is set to about two if the sub-object content field comprises a delay parameter.

16. The method implemented by the network component of claim 12 further comprises:
receiving a RSVP RESV message for the bidirectional LSP;
selecting one of the candidate component links maintained in the list;
adding a TLV that indicates the selected candidate component link in the RSVP RESV message; and
returning the RSVP RESV message.

17. The method implemented by the network component of claim 16, wherein the RSVP RESV message comprises a recorded route object that has a class equal to about 21 and a class type of about two and that comprises at least one sub-object comprising a link (L) bit, a Type field, a Length field, and a sub-object content field, wherein the L bit is set to indicate a corresponding candidate component link, and wherein the Type field is set to about one if the sub-object content field comprises Internet Protocol (IP) version four (IPv4) traffic that is carried on the corresponding candidate component link or is set to about two if the sub-object content field comprises IP version six (IPv6) traffic that is carried on the corresponding candidate component link.

18. A method implemented by a network component comprising:
receiving using a receiver message comprising a Type-Length-Value (TLV) that indicates that a label switched path (LSP) established on a composite link with a peer end point is an aggregated LSP;
receiving in the TLV a plurality of inner labels that correspond to a plurality of data flows of the aggregated LSP;
receiving a Label Distribution Protocol (LDP) label mapping message comprising one or more TLVs that indicate a plurality of candidate component links of the composite link for establishing a bidirectional LSP;
selecting one of the candidate component links;
adding a TLV that indicates the selected candidate component link in a second LDP label mapping message; and
returning the second LDP label mapping message.

19. The network component of claim 1, wherein traffic from the data flows of the aggregated LSP are distributed over more than one of the component links.

20. The network component of claim 19, wherein some of the identifiers are mapped to different component links.

21. The network component of claim 1, wherein the identifiers are inner labels within the signal.

22. The network component of claim 1, wherein some of the component links within the composite links have different bandwidth.

23. The method implemented by the network component of claim 11, wherein the inner labels identify data traffic for each data flow transported within the aggregated LSP.

24. The method implemented by the network component of claim 11, wherein the composite link comprises a plurality of component links for the aggregated LSP to distribute a plurality of data packets that correspond to the data flows amongst the component links.

25. The method implemented by the network component of claim 11, wherein treating the aggregated LSP as the non-aggregated LSP occurs when the message is received on the non-composite link.

26. The method implemented by the network component of claim 11, wherein the component links differ from each other in at least one of the following characteristics: capacity, bandwidth, transport latency, and jitter.

* * * * *

UNITED STATES PATENT AND TRADEMARK OFFICE
CERTIFICATE OF CORRECTION

| | | |
|---|---|---|
| PATENT NO. | : 8,570,871 B2 | Page 1 of 1 |
| APPLICATION NO. | : 13/416650 | |
| DATED | : October 29, 2013 | |
| INVENTOR(S) | : Lucy Yong and Zhenbin Li | |

It is certified that error appears in the above-identified patent and that said Letters Patent is hereby corrected as shown below:

On the Title Page

Page 2, Item -56- Other Publications - The publications should read as follows:

"Apostolopoulos, G., et al., "QoS Routing Mechanisms and OSPF Extensions", RFC 2676, Aug. 1999, 51 pages.

Grossman, D., "New Terminology and Clarifications for Diffserv", RFC 3260, Apr. 2002, 10 pages.

Malis, A., "PPP Over SONET/SDH", RFC 2615, Jun. 1999, 11 pages.

Bryant, Ed., S., et al., "Pseudo Wire Emulation Edge-to-Edge (PWE3) Architecture", RFC 3985, Mar. 2005, 42 pages."

In the Specification

Column 12, Line 28 should read: "signal is sent in a label mapping message using Label Distribution"

In the Claims

Column 13, Line 59 should read: "receiving an RSVP reserve (RESV) message for the bidirectional"

Signed and Sealed this
Twenty-ninth Day of April, 2014

Michelle K. Lee
*Deputy Director of the United States Patent and Trademark Office*